Figure 1:
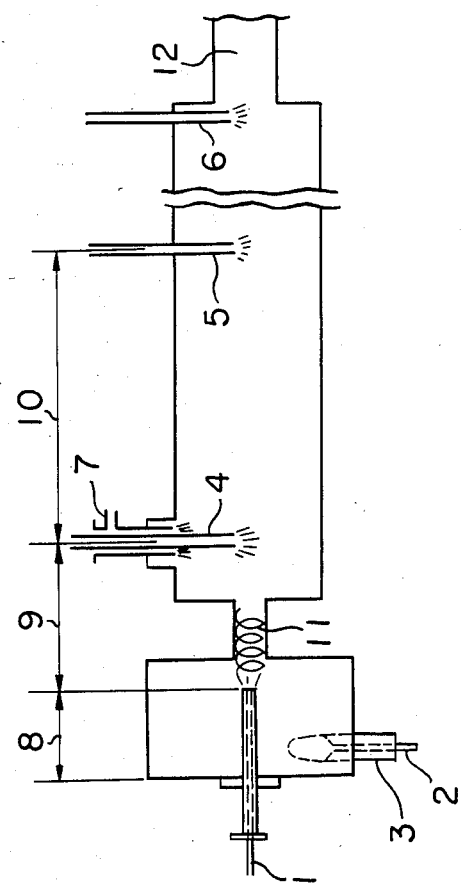

United States Patent [19]

Yoshimura et al.

[11] Patent Number: 4,631,180

[45] Date of Patent: Dec. 23, 1986

[54] PROCESS FOR PRODUCING CARBON BLACK

[75] Inventors: Syushichi Yoshimura; Hiromu Kobayashi, both of Kitakyushu; Yoshikazu Toyonaga, Yamaguchi; Hozo Yamazaki, Kitakyushu; Masanori Karatsu, Yokkaichi, all of Japan

[73] Assignee: Mitsubishi Chemical Industries Ltd., Tokyo, Japan

[21] Appl. No.: 777,762

[22] Filed: Sep. 19, 1985

[30] Foreign Application Priority Data

Sep. 21, 1984 [JP] Japan ............................ 59-198205
Sep. 3, 1985 [JP] Japan ............................ 60-194184

[51] Int. Cl.$^4$ ........................ C01B 31/02; C09C 1/48
[52] U.S. Cl. ................................. 423/450; 423/449; 423/460; 423/461
[58] Field of Search ............... 423/449, 450, 455, 456, 423/460, 461

[56] References Cited

U.S. PATENT DOCUMENTS

| 3,832,450 | 8/1974 | Wiggins | 423/456 |
| 4,101,639 | 7/1978 | Surovikin et al. | 423/449 |
| 4,435,378 | 3/1984 | Reck et al. | 423/460 |
| 4,585,644 | 4/1986 | Divis et al. | 423/450 |

FOREIGN PATENT DOCUMENTS

| 54-126691 | 2/1979 | Japan | 423/461 |
| 553829 | 2/1980 | U.S.S.R. | 423/449 |

Primary Examiner—Gregory A. Heller
Attorney, Agent, or Firm—Oblon, Fisher, Spivak, McClelland & Maier

[57] ABSTRACT

A process for producing carbon black in a reaction system comprising a first zone where a heating fuel material and an oxygen-containing gas are mixed, and a high temperature combustion gas stream is formed, a second zone where a hydrocarbon starting material is mixed to the high temperature combustion gas stream to form carbon black, and a third zone subsequent to and down-stream of the second zone, where the carbon black thus formed, is contacted with an activating agent to activate the carbon black, characterized in that steam is introduced as an activating agent to the third zone.

6 Claims, 1 Drawing Figure

PROCESS FOR PRODUCING CARBON BLACK

The present invention relates to a process for producing carbon black by a furnace method, which is useful for various purposes, e.g. for fillers, reinforcing materials, conductive materials or coloring pigments. More particularly, it relates to a process for producing carbon black having a large surface area, which shows excellent conductivity when incorporated into a paint, a resin or rubber, although its use is not restricted to these specific applications.

Furnace carbon black is usually prepared by a process wherein a heating fuel material and a combustion-promoting gas such as air or oxygen are mixed and burned to form a high temperature gas atmosphere, and a hydrocarbon starting material is sprayed into the high temperature gas atmosphere so that the hydrocarbon starting material undergoes pyrolysis and/or incomplete combustion. Formed carbon black accompanying the decomposed or incompletely burned gas is cooled by a suitable means, and collected by a collecting device which is commonly employed in this field.

As a method for producing carbon black having a large surface area, there has been proposed a method wherein steam is introduced into a high temperature combustion zone prior to the spraying of a hydrocarbon starting material (Japanese Unexamined Patent Publication No. 24455/1981), a method wherein water is jetted into a jet stream of a hydrocarbon starting material (Japanese Examined Patent Publication No. 7634/1979), or a method wherein the surface area of carbon black is increased by introducing a metal salt selected from the group consisting of salts of calcium, barium and strontium into the high temperature combustion zone prior to the spraying of a hydrocarbon (Japanese Unexamined Patent Publication No. 195162/1982).

However, in the process disclosed in Japanese Unexamined Patent Publication No. 24455/1981 or Japanese Examined Patent Publication No. 7634/1979, steam is introduced into a high temperature atmosphere necessary for the formation of carbon black particles, and a temperature drop is likely to result in the furnace due to the difference in the heat capacity between the steam and the furnace atmosphere, whereby it is difficult to obtain a high temperature necessary for the formation of carbon black particles, and it is difficult to control the basic morphology of carbon black. On the other hand, according to the process disclosed in Japanese Unexamined Patent Publication No. 195162/1982, the hydrophilic ash content in the formed carbon black increases, and when such carbon black is blended into a resin or rubber, it is likely that depending upon the field of the application, the ash content is likely to precipitate on the surface of the resin or rubber in a high temperature and high humidity atmosphere, and thus the commercial value will be substantially reduced.

Under the circumstances, the present inventors have conducted extensive research to solve the above problems, and as a result, have found it possible to obtain carbon black having an optional basic structure and a large surface area by introducing an activating agent for enlarging the surface area, after the formation of the basic structure of carbon black, followed by treatment for a certain specific retention time. The present invention is based on this discovery.

Namely, an object of the present invention is to provide a process for producing carbon black having a large surface area which provides excellent electric conductivity.

This object is accomplished by a process for producing carbon black in a reaction system comprising a first zone where a heating fuel material and an oxygen-containing gas are mixed, and a high temperature combustion gas stream is formed, a second zone where a hydrocarbon starting material is mixed to the high temperature combustion gas stream to form carbon black, and a third zone subsequent to and down-stream of the second zone, where the carbon black thus formed, is contacted with an activating agent to activate the carbon black, characterized in that steam is introduced as an activating agent to the third zone.

Now, the present invention will be described in detail with reference to the preferred embodiments.

In the accompanying drawing, FIG. 1 is a diagrammatic view illustrating an apparatus to be used for the present invention.

In the present invention, in order to obtain carbon black having basic particle size and structure, and a controlled surface area, firstly, there must be a first reaction zone where a heating fuel material and an oxygen-containing gas are mixed, and a high temperature combustion gas stream is formed, and a second reaction zone as down-stream of the first zone, where a hydrocarbon starting material is introduced into the high temperature combustion gas stream, by spraying from the burner provided in parallel with or transversely of the high temperature combustion gas stream, and the hydrocarbon starting material is subjected to pyrolysis and/or incomplete combustion to form carbon black.

In the second zone, the introduced hydrocarbon starting material is thoroughly thermally decomposed and/or incompletely burned to form the basic morphology of carbon black including the basic particle size, structure and distribution thereof.

The basic morphology of carbon black such as the particle size or structure may be changed not only by the temperature of the high temperature gas or the amounts of the additives, but also by the turbulence of the high temperature gas stream at the time of the formation of carbon black. In order to promote the turbulence of the high temperature gas stream in the second zone, there may be provided a single or multi-perforated plate or a turbulence means such as a Venturi tube.

Further, the second zone may be controlled by adjusting the location of the inlet for the hydrocarbon starting material and the angle of spraying. Carbon black thus having its basic morphology uniformly controlled, will be transferred, as accompanied by the high temperature gas stream, to the third zone as down-stream of the second zone.

In the third zone, there will be conducted an activating reaction to enlarge the surface area of carbon black obtained in the second zone and the termination of such reaction. Namely, in the present invention, the third zone ranges from the position for supply of the activating agent to the position for supply of the cooling water for stopping the activating reaction.

As the activating agent, steam is employed. The activating agent may be introduced directly in the form of heated steam or in the form of water.

In order to prevent a temperature drop of the third zone by the introduction of the activating agent, it is possible that a supplemental heating fuel material and an oxygen-containing gas to burn it, are mixed and burned, and the resulting high temperature gas is introduced into the third zone from a supply nozzle for the supplemental high temperature gas for heating.

The amount of the activating agent supplied to the third zone is usually from 5 to 50% by volume, from 10 to 45% by volume relative to the amount of gas per unit hour. Here, the amount of gas per unit hour, as the basis for the determination of the amount of the activating gas to be introduced, means the amount of gas per unit hour, of the gas flowing into the third zone from the second zone.

If the amount of the activating agent is less than 5% by volume, no adequate effect will be obtained for increasing the surface area. On the other hand, if the amount is more than 50% by weight, the total gas amount including the amounts of the activating agent and the supplemental high temperature gas required for heating the activating agent, increases, and the retention time of carbon black in the third zone will be shortened accordingly, whereby the activation tends to deteriorate. Further, the total amount of waste gas increases, and it will be necessary to increase the capacity of the apparatus for the separation and recovery of the carbon black, such being undesirable.

The amount of the activating agent and the amounts of other gases in the present invention are the respective amounts under the specified conditions.

The temperature of the third zone is usually from 1200° to 1800° C. preferably from 1300° to 1700° C. If the temperature is lower than 1200° C., the increase of the surface area will be little, and if the temperature is higher than 1800° C., the reaction will be vigorous, thus leading to a decrease of the yield of carbon black. The temperature of the third zone is the temperature at the position where the activating agent is introduced.

The retention time of carbon black in the third zone is usually within a range of from 0.1 to 10 seconds, preferably from 0.3 to 8 seconds, more preferably from 0.5 to 6 seconds. If the retention time is shorter than 0.1 second, no adequate effect for increasing the surface area will be obtained. On the other hand, if the retention time is longer than 10 seconds, the yield of carbon black decreases, such being undesirable.

The retention time is a period of time from the time of the introduction of the activating agent to the time when water is sprayed from the cooling water supply nozzle provided at a down-stream portion of the third zone.

The retention time may be changed by changing the position of the cooling water supply nozzle. For this purpose, there may be provided openings for insertion of a nozzle with a proper distance at the down-stream portion of the third nozzle so that the position of the nozzle may be optionally changed.

Alternatively, a plurality of cooling water supply nozzles may be provided at the down-stream portion of the third zone. In such a case, the retention time is a period of time from the time of the introduction of the activating agent to the time when water is sprayed from the cooling water supply nozzle closest to the position for the introduction of the activating agent.

Carbon black thus formed is transferred together with the gas used for the reaction, and after the usual steps of cooling, separation and recovery, collected in accordance with a conventional method. For instance, the separation of carbon black from the waste gas can readily be conducted by a conventional method by means of a cyclone, an agglomerater, a bag filter or a combination thereof.

The high temperature combustion gas stream in the first zone and the third zone used in the process for the production of carbon black according to the present invention, is prepared by mixing a gaseous or liquid heating fuel material with an oxygen-containing gas such as air, oxygen or a mixture thereof, followed by combustion.

As the heating fuel material, there may be advantageously employed hydrogen, carbon monoxide, methane, natural gas, coal gas, petroleum gas as well as a petroleum-base liquid fuels such as kerosene, gasoline and heavy oil, or coal-base liquid fuels such as creosote oil, naphthalene oil and carboxylic acid oil. As the hydrocarbon starting material, there may be suitably employed an aromatic hydrocarbon such as benzene, toluene, xylene, naphthalene or anthrathene, a coal-base hydrocarbon such as creosote oil, anthrathene oil or carboxylic acid oil, or a petroleum-based heavy oil such as ethylene heavy end oil or FCC oil, or an acetylene-type unsaturated hydrocarbon, or an ethylene-type hydrocarbon such as ethylene or propylene, or an aliphatic hydrocarbon such as pentane or hexane.

According to the present invention, carbon black having a large surface area which exhibits excellent conductivity when blended into a paint, a resin or rubber, can be produced in an industrially advantageous manner, by introducing steam as the activating agent into a high temperature gas containing carbon black in a suspended state, after the basic morphology of the carbon black has been formed.

Now, the present invention will be described in further detail with reference to Examples. However, it should be understood that the present invention is by no means restricted to these specific Examples.

EXAMPLES 1 TO 12

By using a furnace for the production of carbon black having a structure as shown in FIG. 1, 190 Nm$^3$/hr of heating fuel material as shown in Table 3 and 1000 Nm$^3$/hr of air as an oxygen-containing gas were supplied to the first zone of the furnace and burned, and a hydrocarbon starting material as shown in Table 2 was supplied from a hydrocarbon starting material supply nozzle 1 into the high temperature combustion gas stream thereby obtained, at a rate as shown in Table 1, whereby carbon black particles were formed in the second zone. Then, in the third zone, steam, a supplemental heating fuel material (as identified in Table 3) and oxygen as an oxygen-containing gas were introduced into the third zone from the activating agent supply nozzle 4 at the respective rates as shown in Table 1, and the carbon black formed in the second zone was held at the temperature and retention time as shown in Table 1, to conduct activation treatment. The retention time was varied by changing the position of the first cooling water supply nozzle 5. The carbon black cooled by spraying cooling water from the first cooling water supply nozzle 5 and the second cooling water supply nozzle 6, was collected by a cyclone and a bag filter, and the particle size, surface area, oil absorption and microporosity were measured. The results thereby obtained are shown in Table 1.

EXAMPLES 13 TO 15

By using a furnace for the production of carbon black having a structure as shown in FIG. 1, the operation was conducted in the same manner as in Examples 1 to 12 except that 145 Nm³/hr of the heating fuel material and 1000 Nm³/hr of air preheated to 500° C. were supplied to the first zone of the furnace, and air was used as the oxygen containing gas supplied to the third zone. The results are shown in Table 1.

COMPARATIVE EXAMPLES 1 TO 3

Carbon black was prepared under the same conditions as the above Examples (as identified in Table 1) except that steam, the supplemental heating fuel material and the oxygen-containing gas were not supplied to the third zone. Physical properties of the carbon black thereby obtained were measured. The results are shown in Table 1.

COMPARATIVE EXAMPLE 4

Carbon black was prepared in the same manner as in Example 15 except that the activating time was 0.1 second. The results are shown in Table 1.

For the determination of the microporosity of the present invention, a specific surface area was measured by BET method, the pore volumes of pores having a size of from 10 to 300 Å were obtained by the Cranston-Inkley equation, and the microporosity was calculated from the pore volumes in accordance with the following equation.

$$\text{Microporosity (\%)} = \frac{\text{Pore volume of pores of 10-20Å}}{\text{Pore volume of pores of 10-50Å}} \times 100$$

TABLE 1

| | Supply rate of hydrocarbon starting material (kg/hr) | Supply rate of steam (kg/hr) | Supply rate of supplemental heating fuel material (Nm³/hr) | Supply rate of oxygen-containing gas for the combustion of supplemental heating fuel material (Nm³/hr) | Proportion of total supplied steam relative to gas amount per unit hour (vol %) | Activation temperature (°C.) | Activation time (sec.) | Average particle size (Å) | Surface area by nitrogen BET (m²/g) | Oil absorption (ml/100 g) | Microporosity (%) |
|---|---|---|---|---|---|---|---|---|---|---|---|
| Example 1 | 70 | 290 | 77 | 75 | 25 | 1700 | 0.1 | 191 | 572 | 177 | — |
| Example 2 | " | " | " | " | " | " | 0.8 | — | 980 | 245 | — |
| Example 3 | " | " | " | " | " | " | 1.5 | — | 1320 | 271 | — |
| Example 4 | " | 383 | 52 | 51 | 35 | 1500 | 0.5 | 189 | 547 | 185 | — |
| Example 5 | " | " | " | " | " | " | 3.0 | — | 1037 | 235 | — |
| Example 6 | 71 | 150 | 40 | 39 | 14 | 1700 | 0.1 | 192 | 557 | 177 | — |
| Example 7 | " | " | " | " | " | " | 1.5 | — | 1060 | 253 | — |
| Example 8 | 103 | 285 | 85 | 83 | 25 | " | 0.1 | 210 | 246 | 177 | — |
| Example 9 | " | " | " | " | " | " | 1.5 | — | 1280 | 268 | — |
| Example 10 | " | " | " | " | " | " | 2.0 | — | 1350 | 286 | — |
| Example 11 | 70 | 265 | 46 | 44 | 24 | 1610 | 3.6 | 190 | 1360 | 300 | 27.9 |
| Example 12 | " | " | " | " | " | " | 5.4 | " | 1470 | 315 | 30.0 |
| Example 13 | 130 | 200 | 75 | 350 | 15 | 1580 | 4.6 | 195 | 1390 | 315 | 33.5 |
| Example 14 | " | " | " | " | " | " | 6.5 | " | 1505 | 328 | 32.5 |
| Example 15 | 175 | 235 | 40 | 185 | 20 | 1630 | 3.5 | 350 | 823 | 210 | 14.8 |
| Comparative Example 1 | 67 | 0 | 0 | 0 | 0 | 1700 | 0.1 | 199 | 563 | 167 | — |
| Comparative Example 2 | " | " | " | " | " | " | 1.5 | — | 802 | 189 | — |
| Comparative Example 3 | " | " | " | " | " | " | 2.0 | — | 880 | 196 | — |
| Comparative Example | 175 | 235 | 40 | 185 | 20 | 1630 | 0.1 | 350 | 130 | 210 | 7.0 |

TABLE 1-continued

| Supply rate of hydrocarbon starting material (kg/hr) | Supply rate of steam (kg/hr) | Supply rate of supplemental heating fuel material (Nm³/hr) | Supply rate of oxygen-containing gas for the combustion of supplemental heating fuel material (Nm³/hr) | Proportion of total supplied steam relative to gas amount per unit hour (vol %) | Activation temperature (°C.) | Activation time (sec.) | Formed carbon black Average particle size (Å) | Surface area by nitrogen BET (m²/g) | Oil absorption (ml/100 g) | Microporosity (%) |
| --- | --- | --- | --- | --- | --- | --- | --- | --- | --- | --- |
| ple 4 | | | | | | | | | | |

TABLE 2

Hydrocarbon starting material

| Physical properties: | Kind Creosote oil |
| --- | --- |
| Specific gravity (15° C.) | 1.100 |
| Carbon content (wt. %) | 90.8 |
| Hydrogen content (wt. %) | 6.1 |
| Viscosity (50° C.) | 10 cp |

TABLE 3

Heating fuel material & Supplemental heating fuel material

| Kind Composition | Coal gas (vol. %) |
| --- | --- |
| $CO_2$ | 2.0 |
| $O_2$ | 0.5 |
| $C_nH_m$ | 3.2 |
| CO | 6.5 |
| $H_2$ | 54.0 |
| $CH_4$ | 28.6 |
| $N_2$ | 5.2 |

We claim:

1. A process for producing carbon black, comprising:
   (a) generating a high temperature combustion gas stream in a first zone by the combustion of a heating fuel with an oxygen containing gas;
   (b) mixing a hydrocarbon starting material with the high temperature combustion gas stream as the stream passes into a second zone, thereby forming carbon black particles; and
   (c) without allowing the carbon black particles to cool, intimately contacting the carbon black particles with steam as an activating agent at a temperature of 1200°–1800° C. for a time of from 0.1–10 seconds in a third zone downstream form the second zone, thereby activating the carbon black.

2. The process of claim 1, wherein the steam is introduced into said third zone in an amount of from 5–50% by volume relative to the amount of gas per hour.

3. The process of claim 1, wherein the temperature in the third zone ranges from 1300°–1700° C.

4. The process of claim 1, wherein said retention time ranges from 0.3–8 seconds.

5. The process of claim 1, wherein said heating fuel is a material selected from the group consisting of hydrogen, carbon monoxide, methane, natural gas, coal gas, petroleum gas, kerosene, gasoline, heavy oil, creosote oil, naphthalene or carboxylic acid oil.

6. The process of claim 1, wherein said hydrocarbon starting material is an aromatic hydrocarbon, a coal-based hydrocarbon, a petroleum-based heavy oil, an acetylenic hydrocarbon, an ethylenically unsaturated hydrocarbon, or an aliphatic hydrocarbon.

* * * * *